Feb. 14, 1967 R. W. SPINDLER 3,303,598
BOBBER
Filed Aug. 30, 1965
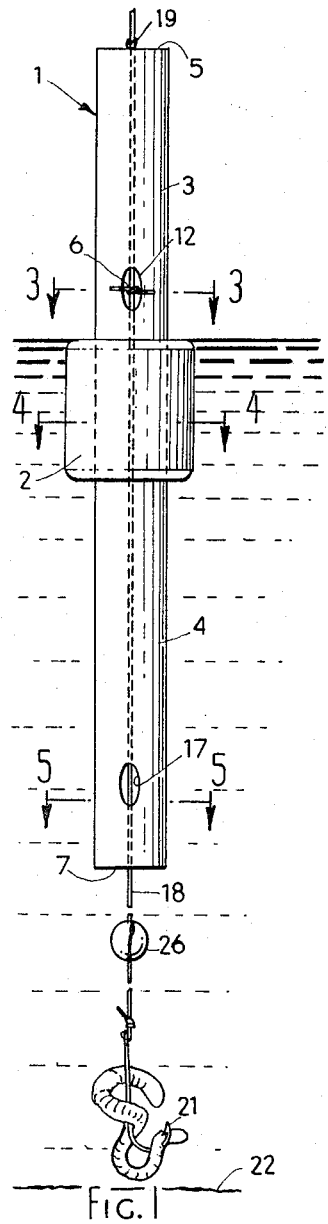
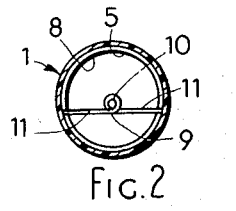
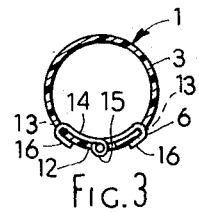
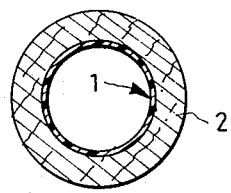
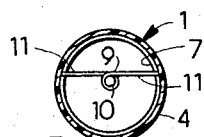
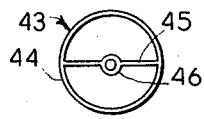
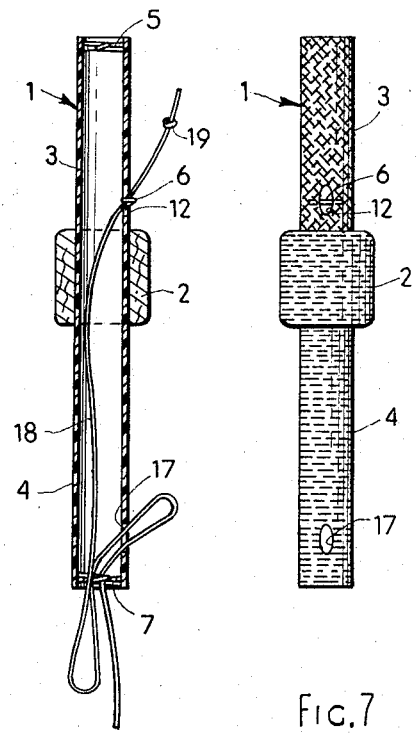
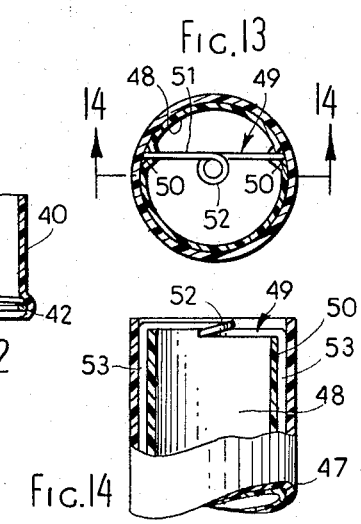
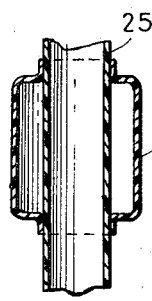
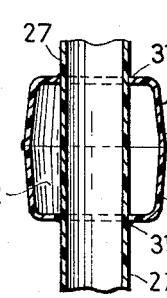
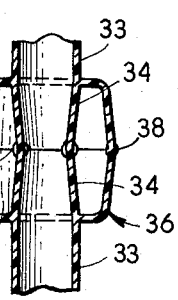
INVENTOR
ROY W. SPINDLER
by JEFFERS & YOUNG
ATTORNEYS United States Patent Office 3,303,598
Patented Feb. 14, 1967

3,303,598
BOBBER
Roy W. Spindler, R.R. 1, New Haven, Ind. 46774
Filed Aug. 30, 1965, Ser. No. 483,706
7 Claims. (Cl. 43—44.9)

This application is a continuation-in-part of my earlier, now abandoned application filed May 11, 1964, Serial No. 366,666.

This invention relates to fishing tackle and more particularly to a bobber adapted for attachment to a fishing line. The bobber incorporates improved principles of design and in construction and is essentially a relatively long tubular open ended staff having a localized float means carried by the staff at a location in which the staff is divided into two unequal lengths and having a line engaging means on at least one of its extremities.

In order for a bobber to be of maximum use to the fisherman, it must provided certain essential functional features, among which are:

(1) Good stability in the wind,
(2) Good visibility to the fisherman,
(3) Good sensitivity to light bites,
(4) Good anchorage in the water, and
(5) Provide an indication when the sinker is on the bottom.

One of the principal ways I have achieved these important results is by use of a relatively long, but thin walled tubular member which is equipped with line guides and can readily slide on the line. My invention provides all of these advantages and by means of a structure which is simple to construct, to use and is relatively inexpensive to manufacture. The present invention is an improved slip bobber, a slip bobber being a bobber equipped with guides so that it can slide on the line which has a knot determining the depth at which the fishing occurs. The knot is located in the line above the bobber. The locating knot, either of plastic or rubber construction can with effort be caused to slide adjustably along the length of the line.

It is also an important feature of the present invention that the bobber can be readily attached to the line by means of a unique threading method.

Other objects and features of the invention will become apparent from a consideration of the following description which proceeds with reference to the accompanying drawings, wherein:

FIGURE 1 is a view showing the bobber in use in a body of water;

FIGURE 2 is a top view of the bobber shown in FIGURE 1;

FIGURE 3 is a horizontal sectional view taken on line 3—3 of FIGURE 1;

FIGURE 4 is a section view taken on line 4—4 of FIGURE 1;

FIGURE 5 is a section view taken on line 5—5 of FIGURE 1;

FIGURE 6 is a longitudinal section view taken through the length of the bobber and illustrating the threading means for attaching the line;

FIGURE 7 illustrates the coloring of portions of the bobber;

FIGURES 8, 9 and 10 are partial sectional views of float sections of modified bobbers;

FIGURE 11 is a top view of a modified form of line engaging means or guide;

FIGURE 12 is a partial vertical section view of modified form of bobber construction;

FIGURE 13 is a top view of a modified form of a line engaging means; and,

FIGURE 14 is a vertical section taken substantially on line 14—14 of FIGURE 13.

Referring to the bobber construction in the embodiment of FIGURES 1–7 the bobber is comprised of a thin walled tubular member designated generally by reference numeral 1 and constituting a staff, a float means 2 carried by the staff and dividing the tube into an upper tubular portion 3 and a lower tubular portion 4 which is longer than tubular portion 3. The upper tubular portion has two distinct line guides 5 and 6 and the lower portion 4 has a line guide 7. The tubular member is constructed of a durable light weight plastic. The tubular member is generally in the form of a cylinder having a uniform relatively thin wall and relatively large inside and outside diameter, these factors being important in order to permit the construction of a large lightweight bobber having good stability in the wind and good visibility to the fisherman, which acts as a tunnel, offering no resistance to entry of water and thus easily "diving" in response to fish bite, or pulling on the line by the fisherman. The staff provides a tunnel which provides an unobstructed flow of water through the staff. The flotation bulb is localized in the form of a cylinder, with the corners rounded slightly, whose length and outer diameter are virtually the same or short conical sections joined together, having virtually the same form as the cylinder, or a sphere and is constructed of balsa wood, foam plastic or is comprised of a plastic enclosed air space. The flotation bulb is mounted on the staff in axial and concentric alignment with it so that the upper end of the staff 3 extends beyond the flotation 2 at least equal the length of the flotation and the lower end of the staff 4 extends beyond the flotation at least one and one-eighth (1⅛) times the length of the flotation. Also the inner diameter of the staff is at least one-fourth (¼) of the outer diameter of the flotation. The above dimensions are for illustration and not by way of limitation.

*Stability*

By using a combination of guides 6 and 7 the line pull leverage on the top end of the bobber is very much reduced; since the upper tubular section 3 is shorter than the lower tubular section 4 and by further reason of the fact that the flotation bulb 2 is localized, the leverage of the wind on the top end of the staff which tries to tip the bobber over is very much reduced. The leverage of the sinker pulling down on the localized flotation, to keep the bobber erect, is great because the distance from the lower guide to the localized flotation bulb is long, due to the fact that the flotation is localized. These factors all combine to produce a more stable condition of bobber which is held erect on windy days.

*Guides*

Referring to guides or fittings 5 and 7 (FIGURE 1), I find it preferable to make these fittings from non-corrosive wire including an eyelet 10 and cross member 9. Portions 11 extend outwardly from the eyelet and are joined to the ring 8. The outer rings of the guide means 5, 7 are of such a diameter that they will temporarily hold themselves in the ends of the tubular member and are then permanently anchored by any suitable means such as by cement or the like. The eyelets 10 (FIGURES 2, 5) at the top and bottom of the staff are slightly offset from the axis of the tubular member and the lower guide means (FIGURE 5) is of sufficient structural strength that it will resist impact from the sinker 26 when the line 18 is drawn through the bobber.

The eyelet at the upper end of the staff, is dimensioned so that it will stop the knot on the line.

Indicating function

Most fishermen prefer a bobber which will lie prone upon the water when the sinker 26 and the hook 21 are on the bottom. In the bobber of the present invention the upper guide means 5 is made heavy enough to overbalance the bobber against the weight of the lower tubular section 4 and the weight of the lower guide 7, causing the bobber to tip from an erect or vertical position (FIGURE 1) to a prone position when the hook 21 and the sinker 26 are on the bottom 22 (FIGURE 1). The line is preferably provided with a knot for engaging the eye 10, for gauging and suspending the sinker 20 and the baited hook 21 predetermined distances from a bottom 22 of a body of water and so the sinker and hook will normally maintain the bobber in an erect position.

Additional guide

The wall of the upper section of bobber is provided with an elliptical or oblong opening 12 (FIGURES 1, 3) and has a pair of openings 13 disposed one on each of opposite sides of the opening 12. A fitting or line guide 6 (FIGURE 3) is adapted for permanent attachment to the tube and is of non-corrosive wire comprised of a curved portion 14 with a centrally disposed eyelet 15 and offset spaced legs 16 extending from the ends of the curved portion. The fitting is attached by passing its ends through 13 from the inside of the tube and bending the legs 16 back toward the eyelet on the outside of the tube to clamp the fitting in place. This eyelet is also small enough to stop the knot on the line.

Anchorage

The bobber may be used with any type of rod or pole. Anchorage in a bobber is the ability of the slip bobber to hold its distance in the water away from the fisherman when receiving a quick jerk by the fisherman and by so doing transmitting a lateral jerk by the fisherman as a vertical jerk to the hook. We are assuming that the fisherman is using a spinning rod. This bobber has metallic line guides to contribute considerably to its good anchorage. Another big factor is its very large size which is due to the hollow construction. Another factor is the unobstructed water passage or tunnel through it, which contributes to its ability to dive down at an angle away from the fisherman upon receiving a sharp jerk from the fisherman.

At the lower end of the staff is a second opening 17 which facilitates threading the line through eyelet 10 at the bottom of the staff.

Threading operation

For fishing during windy conditions when it is desirable to use guides 6 and 7, I thread the line through the eyelet 15, guide 6, and oblong opening 12 (FIGURES 3, 6) down through the staff and out the bottom end. It is next passed back on the same side of the crossbar as it came out on, through the threading hole 17. From there it is passed back through the threading hole 17 and through the lower guide eyelet 10, whereby the line will extend through the eyes of the guides 6 and 7. The threading operation for using guides 5 and 7 is virtually the same as the above except that the line is first passed through guide 5. The eye of the lower guide 7 may also be larger than the eye of the upper guide 5 in order to facilitate threading of the line therethrough. On calm days it is preferred to use the upper guide 5 at the upper portion of section 3 of the tubular member in conjunction with the guide opening at the bottom of the staff, this having the advantage of a little better anchorage and more line length between the hook and sinker for those who want it.

Anti-hooking

If the length of line between hook and sinker is longer than the distance between the guides used then occasionally on the cast out the hook will hook the line above the top guide used and thus be hung up on the line above the bobber at the completion of the cast out. By using guide 5 this length between hook and sinker can be as long as the bobber is. Some fishermen like this length to be long. In either method of threading, the line can be passed through the bobber which slides easily on the line 18. Also, if desired, particularly when the inside of the staff is wet, I have found it useful to use an instrument such as a pipe cleaner for forcing the line through the staff.

The fitting 5 and 7 are preferably so anchored that their eyes are located off-center with respect to the longitudinal axis of the staff, with the eye of the fitting 5 being slightly closer to that portion of the staff which carries the fitting 6, whereas the eye of the fitting 7 is preferably closer to the opposite portion of the staff. It should be noted that the cross-member 9 of the lower fitting or guide 7 is preferably of a larger cross-sectional dimension than that of the cross-member of the upper or top fitting 5 due to the fact that the lower fitting is subjected to some shock by a sinker 26. The eye of the lower guide may also be larger than the eye of the upper guide in order to facilitate threading the line therethrough. The eye of the upper guide means is preferably small enough to stop the knot on the line.

Sensitivity

The bobber has the advantage of extreme sensitivity, at least partially owing to the fact that the flotation bulb or element 2 is totally immersed and is small to carry a light sinker 26. When the bobber is sunk in the water it has as a remainder only the hollow upper portion 3 of the staff 1 the only resistance to bites being the inertia of the bobber and the displacement of the relatively thin-walled upper bobber section, which being slight, and acting as a tunnel for the water when pulled down, makes the bobber extremely sensitive to light bites. This is an important consideration particularly when fishing in lakes which are extensively fished where fish are of a wary nature, tending to bite only lightly and making a sensitive bobber more necessary.

Visibility

As indicated in FIGURE 7, the portion of the bobber which is submerged is of aluminum color, being unapparent from below the water, while the upper portion 3 is large, due to the oversize staff, and is colored fluorescent orange for good visibility and is readily seen by the fisherman. As a consequence of these foregoing considerations, not only does the bobber have good stability in both windy and under calm conditions, but has good visibility, sensitivity, anchorage and will change its position according to whether the hook and sinker are at the bottom or above the bottom 22 (FIGURE 1).

Modification

A modified form of bobber is shown in FIGURE 8, and in this embodiment, the float means 24 is in the form of a single piece air chamber thermoformed from a piece of plastic tubing having a wall thickness of approximately two times the wall thickness of the staff and whose inside diameter equals the outer diameter of the staff 25 so that it will slip over the staff and can be adjusted to whatever position is desired. After the thermoforming operation is complete the outer wall of the air chamber will approximate the wall of the staff in thickness. The float means 24 can be secured to the staff through the ends thereof which engage the staff 25 and are bonded thereto by suitable adhesive, or a friction grip can be relied upon to hold the float in place. This embodiment provides an economical construction. In all other respects the structure and function of the bobber is the same as shown in FIGURES 9 and 10. Instead of having two shells constituting the float it is possible with the single shell to produce the desired structure.

Referring to the embodiment or modified structure illustrated in FIGURE 9 there is shown a single tubular staff having an upper extremity 26 and a lower extremity 27 with float means generally designated 28 therebetween. The staff may be provided with fittings or line engaging means and openings corresponding to or different from those described above. The float means 28 is preferably comprised of a pair of corresponding plastic shells 29 which may be slid onto the staff into abutting relationship and held in this relationship by cement or other means of joining as indicated at 30 and to the staff as indicated in 31 so as to provide in combination with the staff an annular air chamber 32 disposed in concentric spaced relation to the longitudinal axis of the staff.

In the modified structure shown in FIGURE 10 the bobber is comprised of two corresponding plastic moulded sections 33. Each of the sections preferably comprises a tubular conical portion 34 of a staff and a conical wall portion 35 constituting one half of a float means generally designated 36. The wall portions 35 are disposed in concentric surrounding relation to the conical extremities and the annular edges of the conical portions are preferably joined together by cement as indicated at 37 and the edges of the wall portion 35 at 38 to form an annular air chamber 39 surrounding the axis of the staff. Obviously, the portions 34 and 35 may be secured together by utilizing means other than cement. The conical portions of the staff and conical wall portions are preferably so made whereby to facilitate the operation of moulding the sections.

In FIGURE 11 there is shown a different form of a line guide or engaging means generally designated 43, which is preferably constructed by a stamping operation to provide a one-piece substantially planar element having a ring portion 44 and a cross-portion 45 provided with an eye 46. A guide of this character may be utilized in lieu of the guides 5 and 7.

In FIGURE 12 there is disclosed a portion of a different form of a bobber staff 40. An end of the staff is preferably provided with an enlargement to form an internal annular groove 42 constituting a seat on which a guide 41 is disposed and preferably locked in by crimping a flange 43, forming a portion of the seat, thereupon. This organization affords a setup whereby the guide or line engaging means may be assembled by a unique method which may comprise expanding a portion of the staff, such as an end thereof to provide an internal seat, disposing the guide on the seat and then crimping or deforming the flange 43 upon the guide for locking the same in place. The guide 41, except for its diametrical dimension, substantially corresponds to the guides illustrated in FIGURES 2, 5 and 11.

In FIGURES 13 and 14 there is disclosed a different way of mounting a modified form of a fitting or line engaging means on a staff 47. In this organization, there is a unit or subassembly comprising a cylindrical insert 48 and a fitting or line engaging means, preferably of non-corrosive wire, generally designated 49 secured thereto. This insert is preferably provided with a pair of circumferentially spaced longitudinally extending parallel external recesses or grooves 50. The fitting comprises a cross-portion 51 formed with an eye 52 and a pair of offset parallel legs 53 which are adapted for reception in the recesses 50. The components are preferably assembled by first inserting the legs of the fitting into the recesses to constitute the unit or subassembly which is then placed into an end of the staff where it is preferably secured in place by any suitable means such as cement. The staff may be provided with one or two of the units including an intermediate fitting similar to the fitting 6 or the latter may be eliminated.

In each of the foregoing embodiments there is combined the feature of good sensitivity and good anchorage as well as a high degree of visibility and stability in the water. These features are achieved by virtue of the relatively large but thin-walled structure of the staff together with a localized flotation medium and unique placement of guide means. In each instance, the line is free to slip through the bobber and the bottom guide means is structurally strong enough to take the impact of the sinker. The invention also incorporates an important feature of making possible suitable distance between the hook and sinker in order that during a cast the line will not be hung up because of hook lashing back and engaging the line above the bobber at the end of the cast.

The stability of the bobber is inherent in the structure as described in each of the embodiments; in addition to these various advantages I have succeeded in actually increasing the sensitivity of the bobber because of the large non-obstructive opening or tunnel which extends through the entire length of the bobber and enables the building of a large bobber without considerable weight and displacement flotation. This important principle is incorporated into each of the described embodiments and accounts at least in part for the achieving of improved fishing operation.

Although the present invention has been illustrated and described in connection with a plurality of example embodiments, it will be understood that this is illustrative of the invention and is by no means restrictive thereof. It is reasonably to be expected that those skilled in this art can make numerous revisions and adaptations of the invention, and it is intended that such revisions and adaptations will be included within the scope of the following claims as equivalents of the invention.

I claim:

1. A bobber comprising a tubular member for use as a staff, a pair of guide means disposed one at each of the opposite ends of said staff adjacent the open ends thereof, each of said guide means comprising a relatively thin wire including an annular portion which is fitted within the interior of said staff and is secured thereto, and a chordal portion including an eyelet offset slightly from the axial center line of said staff to provide spaced aligned guidance surfaces through which a fishing line can be threaded through said staff and is slidable relatively thereto, and a flotation bulb carried by the outer periphery of said tubular member and dividing it into a submerged portion and an erect upper portion, and proportioned to be of a volume which provides flotation support for the bobber, a sinker, a hook, and the fishing line, the portion of the staff extending above the water being of relatively large outer diameter and thin-walled construction to offer insubstantial resistance to submergence responsive to fishing bite.

2. A bobber comprising a tubular member for use as a staff, a pair of guide means disposed one at each of the opposite ends of said staff adjacent the open ends thereof, each of said guide means comprising a relatively thin wire including an annular portion which is fitted within the interior of said staff and is secured thereto and a chordal portion including an eyelet offset slightly from the axial center line of said staff to provide spaced aligned guidance surfaces through which a fishing line can be threaded through said staff and is slidable relatively thereto, a flotation bulb carried by the outer periphery of said tubular member and dividing it into a submerged portion and an upper erect portion, proportioned to be of a volume which provides flotation support for the bobber, a sinker, a hook, and the fishing line, the upper portion of the staff extending above the water being of relatively large outer diameter and thin-walled construction to offer insubstantial resistance to submergence responsive to fishing bite, and auxiliary means in the form of an opening adjacent the submergible end of said bobber and through which a fishing line is passed to assist in threading the fishing line through the guide means at the bottom end of said staff.

3. A tubular member constituting a staff of a bobber device, a tubular element disposed in one end of said member and provided with a pair of longitudinally extending recesses, a line guide having an eye and a pair of opposed offset legs disposed in said recesses for generally centering said eye in said tubular element and member, and means for securing said tubular element and guide in place substantially within the confines of said member.

4. A member constituting a staff of a bobber, said member comprising a cylindrical wall defining a tube, an opening provided in said wall, a pair of holes provided in said wall on opposite sides of said opening, a wire fitting having a curved portion provided with a line guiding eye, and a pair of offset legs constituting continuations of said curved portion secured in said holes so that said curved portion is engaged with an inner surface of said wall and said eye is located substantially centrally in said opening.

5. A fishing bobber, comprising: a relatively light thin-walled tubular member, float means dividing said tubular member into a submerged portion and an upwardly extending portion projecting above the surface of the water and having a readily visible surface, which forms a tunnel offering only insubstantial resistance to submergence responsively to bite, guide means at the submerged open end of said tubular member through which a fishing line is threaded as it passes longitudinally through said staff, a combination of guide means disposed one at the upper opened end of said staff and the other disposed along the side of said staff adjacent said flotation bulb and one of which serves in conjunction with the lower guide means for the fishing line in accordance with the surface condition of the water, said guide means at the upper end and submerged end of said tubular member is constituted by an annular wire gripped by the staff and having chordal portions terminating in an eyelet located off center from the axial center line of said tubular portion, and means for securing said guide means within the tubular member.

6. A bobber, comprising: a cylindrical relatively thin-walled tubular member forming a staff, a flotation bulb supported on the outer surface of said staff and dividing said staff into a lower submerged portion and an upper portion extending above the surface of the water for visibility, said upper portion of the staff extending beyond the flotation bulb a distance at least equal to the length of the flotation bulb and the lower portion of the staff extending below the flotation bulb a distance at least one and one-eighth (1⅛) times the length of the flotation bulb, said flotation bulb being in the form of a cylinder and having a length and outside diameter of substantially the same dimension, said staff having an inner diameter of at least one-fourth (¼) of the outerside diameter of the flotation bulb, and guide means disposed one at each end of said staff and adapted to slidably receive a fish line therethrough, each of said guide means having an eyelet disposed within said tubular member and disposed substantially at the axial center line of the staff, said tubular member offering only insubstantial resistance to submergence when the bobber is floating.

7. A bobber, comprising: a cylindrical relatively thin-walled tubular member forming a staff, a flotation bulb supported on the outer surface of said staff and dividing said staff into a lower submerged portion and an upper portion extending above the surface of the water for visibility, said upper portion of the staff extending beyond the flotation bulb a distance at least equal to the length of the flotation bulb and the lower portion of the staff extending below the flotation bulb a distance at least one and one-eighth (1⅛) times the length of the flotation bulb, said flotation bulb being in the form of a cylinder and having a length and outside diameter of substantially the same dimension, said staff having an inner diameter of at least one-fourth (¼) of the outside diameter of the flotation bulb, guide means disposed one at each end of said staff and adapted to slidably receive a fishing line therethrough, each of said guide means having an eyelet disposed within said tubular member, and additional line guide disposed along the side of said tubular member and adjacent said flotation bulb, said additional line guide means being adapted to receive a fishing line which is strung through a combination of the guide means adjacent the flotation bulb and the guide means at the submerged open end of said staff.

References Cited by the Examiner

UNITED STATES PATENTS

| | | | |
|---|---|---|---|
| 322,088 | 7/1885 | Behrens | 43—44.91 |
| 839,104 | 12/1906 | Buschemeyer | 43—24 |
| 1,193,912 | 8/1916 | Maire et al. | 43—43.1 |
| 2,282,618 | 5/1942 | Stewart | 43—24 X |
| 2,500,078 | 3/1950 | Ingram | 43—44.91 |
| 2,531,806 | 11/1950 | Coughlin | 43—44.91 |
| 2,645,051 | 7/1953 | Stofleth | 43—44.9 X |
| 2,693,049 | 11/1954 | Atton | 43—44.9 |

FOREIGN PATENTS

| | | |
|---|---|---|
| 353,204 | 6/1905 | France. |
| 926,589 | 4/1947 | France. |

ABRAHAM G. STONE, *Primary Examiner.*

SAMUEL KOREN, R. L. HOLLISTER,
*Assistant Examiners.*